No. 789,442. PATENTED MAY 9, 1905.
M. MILCH.
CONTROLLING ALTERNATING CURRENT MOTORS.
APPLICATION FILED OCT. 24, 1903.
2 SHEETS—SHEET 2.
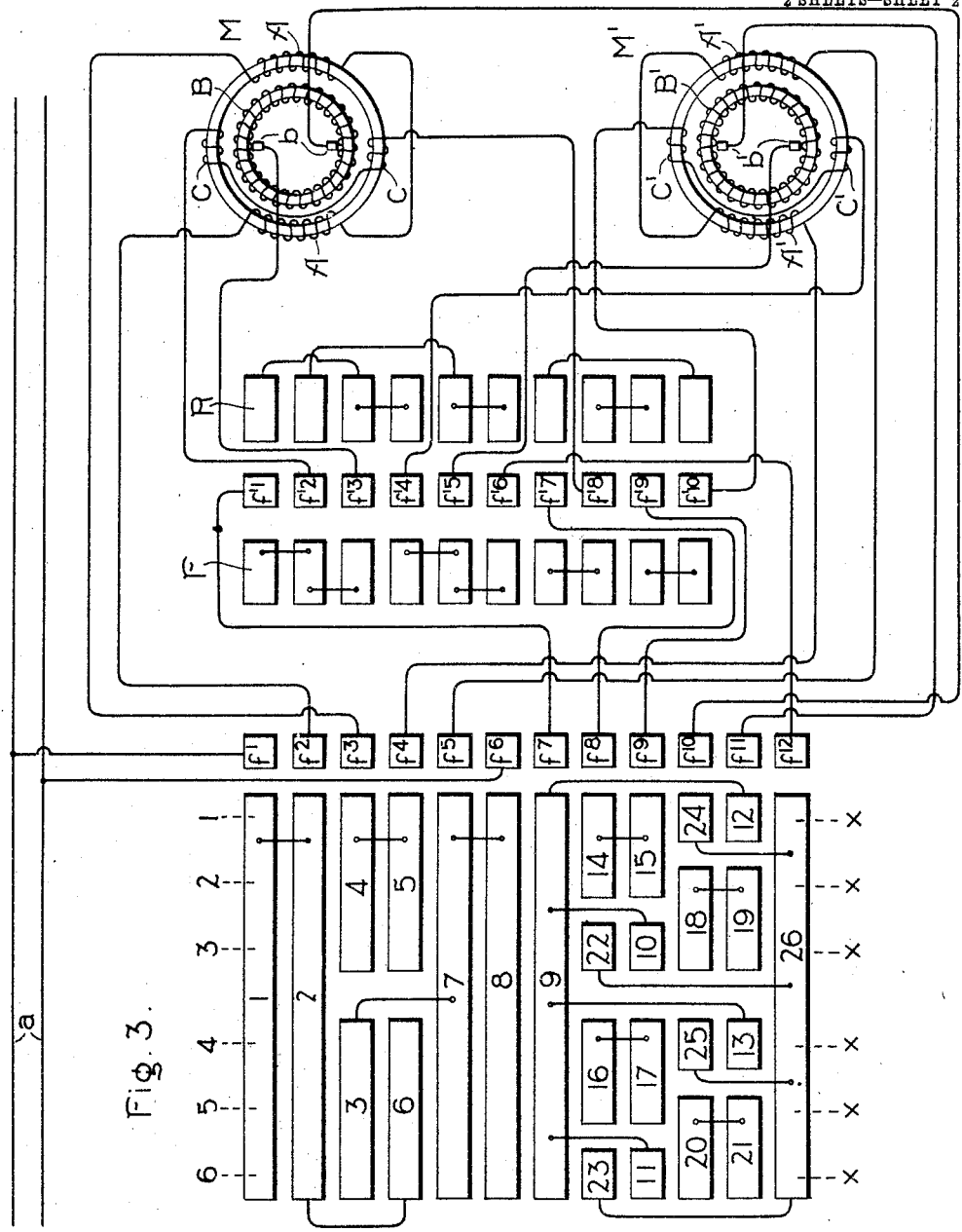
WITNESSES:
INVENTOR.
Maurice Milch.
BY
ATTORNEY.

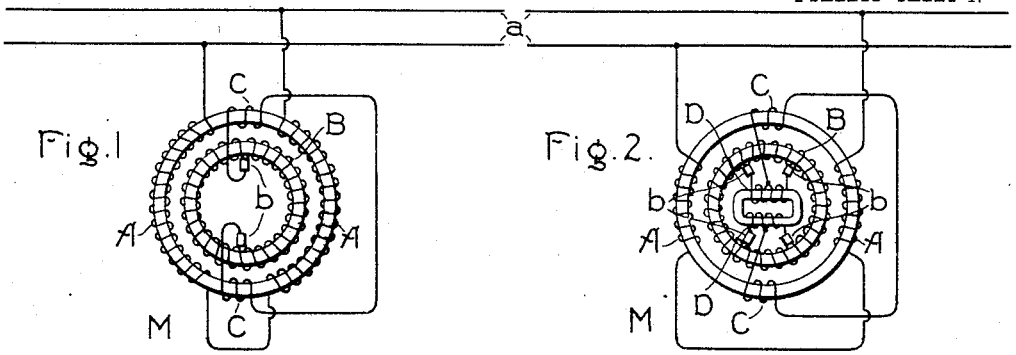
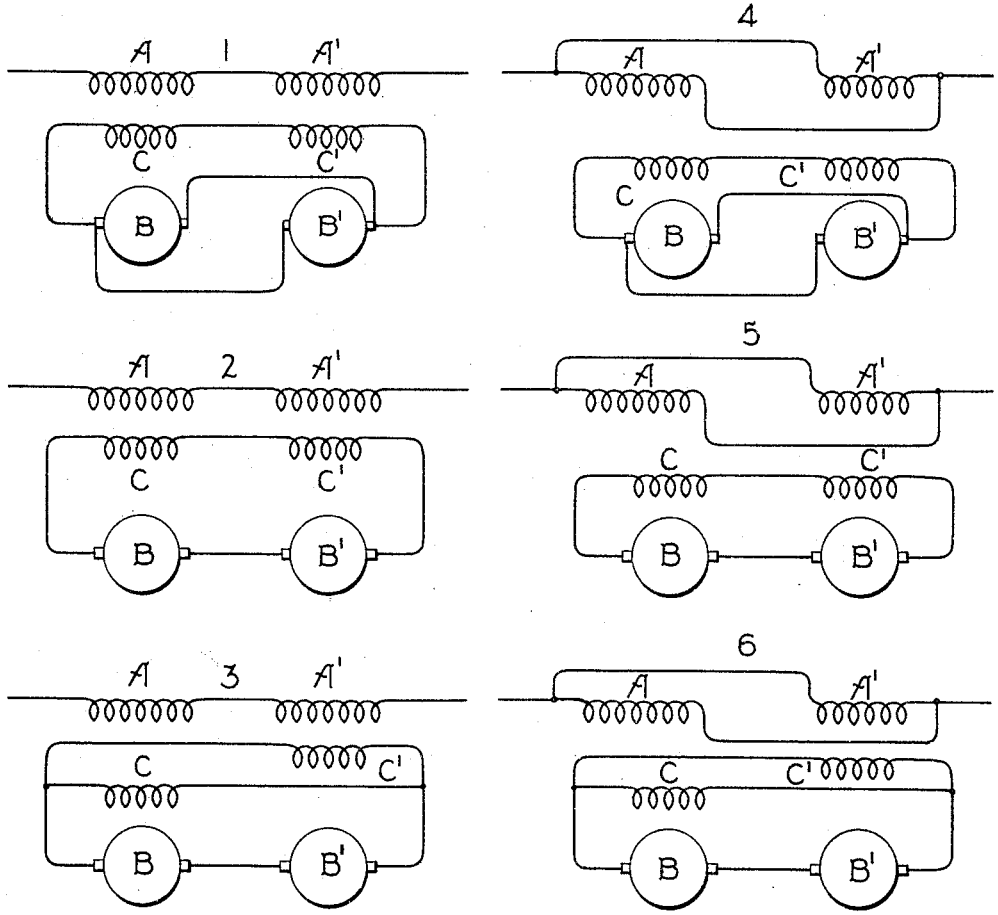

No. 789,442.                                              Patented May 9, 1905.

UNITED STATES PATENT OFFICE.

MAURICE MILCH, OF SCHENECTADY, NEW YORK, ASSIGNOR TO GENERAL ELECTRIC COMPANY, A CORPORATION OF NEW YORK.

CONTROLLING ALTERNATING-CURRENT MOTORS.

SPECIFICATION forming part of Letters Patent No. 789,442, dated May 9, 1905.

Application filed October 24, 1903. Serial No. 178,351.

*To all whom it may concern:*

Be it known that I, MAURICE MILCH, a subject of the Emperor of Austria-Hungary, residing at Schenectady, in the county of Schenectady and State of New York, have invented certain new and useful Improvements in Controlling Alternating-Current Motors, of which the following is a specification.

My invention relates to the simultaneous control of a plurality of alternating-current motors, and refers especially to a type of alternating-current motor devised by me and disclosed in my application, Serial No. 176,606, filed October 12, 1903.

The object of my invention is to provide means for the operation from a single point of a plurality of such motors at varying speeds, with gradual accelerations from the lowest to the highest speed and with simple and efficient means for such control and for reversal, with the use of no external resistance and with the minimum of complication.

In the accompanying drawings, Figure 1 represents diagrammatically a simple form of the motor to which my present invention is applied. Fig. 2 represents a modified form of the same. Fig. 3 shows an arrangement of circuits and controller-contacts embodying my invention, and Fig. 4 shows diagrammatically the circuits obtained by the action of the controller.

Referring to Fig. 1, A A represent the main magnetizing-coils of the motor M, connected to the mains *a a*. B represents the winding of the rotor, which is supplied with the brushes *b b*. Winding B acts as a transformer-secondary for the windings A A, which induce in winding B an electromotive force having its maximum value on the line of the brushes *b b*. The brushes *b b* are connected in series with the auxiliary field-windings C C, which produce a magnetization of the motor on a line at right angles to that of rotor-winding B and create a torque with the current in the rotor-winding.

Fig. 2 shows a modified form of the motor, in which only the active rotor-turns are employed to furnish the current for the auxiliary coils C C, while the idle rotor-turns are prevented from setting up currents which would interfere with the proper operation of the motor. In this modification four brushes are used and are connected by differential choke-coils D D. These coils choke back the flow of current from the idle parts of the rotor-winding adjacent to coils C C, but offer no impedance to the flow of current from the active rotor-coils adjacent to the main coils A A.

It will be seen that the torque of the motor depends upon the field of winding C C and the current in rotor-winding B, while the direction of rotation depends upon the relative directions of magnetization of these two windings. Therefore the amount of torque can be varied by varying the current either in coils C C or in rotor-winding B, or in both, and the direction of rotation may be changed by changing the relative connection of coils C C to rotor-winding B. Thus with this construction of motor I combine the advantages of the repulsion type and the series type of alternating-current motor, since the torque and direction of rotation may be controlled without shifting the brushes, as in the series type of motor, while the voltage in the rotor-windings, and consequently on the commutator, may be made of any value desired, as in the repulsion type of motor. Thus I avoid, on the one hand, the necessity of shifting the brushes to secure a reversal of direction of rotation, as is necessary in the repulsion-motor, and, on the other hand, I avoid the dangers of breakdown and difficulties of commutation due to the impressing upon the commutator the full line voltage, as is necessary with the series motor unless step-down transformers are used.

The torque is proportional to the product of the field of the auxiliary coils C C and the ampere-turns of the rotor-winding B, or since the current in the rotor-winding B and in the auxiliary coils C C is equal the torque is proportional to the square of the induced electromotive force in the rotor-winding B or, neglecting leakage, to the square of the impressed voltage on windings A A. It will thus be seen that the torque can be varied by varying either the impressed voltage on windings A A or by varying the effective ampere-turns of auxiliary coils C C. In my system of control I take advantage of these two methods of varying the torque, first, by connecting the main magnetizing-coils of a plurality of motors in series and in parallel, thus varying the impressed voltage on the main magnetizing-windings, and, second, by varying the connections of the different rotors and auxiliary coils, thereby varying the effective ampere-turns of the auxiliary coils.

In Fig. 4 are shown six arrangements which may be secured with a single pair of motors. In these diagrams, A A' represent the main magnetizing-coils of two motors, B B' represent the rotors or armatures, and C C' the auxiliary field-coils. In diagram No. 1 coils A A' are connected in series across the line, each receiving one-half of the line voltage. Rotors B B' are connected in parallel, thus obtaining the lowest induced voltage, while auxiliary coils C C' are connected in series across the rotor-terminals. In diagram No. 2 the rotors B B' are connected in series, thus doubling the induced voltage in the local circuit. In diagram No. 3 auxiliary coils C C' are connected in parallel, thus reducing the impedance in in the local closed circuit. In diagram No. 4 the main coils A A' are connected in parallel to the line. Thus each receives the full line voltage. The rotors B B' and auxiliary coils C C' are connected as in Fig. 1. Diagrams Nos. 5 and 6 correspond to diagrams Nos. 2 and 3, except that the connection of the main coils A A' is as in Fig. 4.

The amount of current-flow in the local circuit and the torque due to that current under the different conditions of the local circuit shown in the diagrams depend partly upon the relative ampere-turns and impedance of the rotor-windings on the one hand and of the auxiliary field-coils on the other. Accordingly the relative acceleration in changing from one position to another will depend upon the design of the motors.

It is obvious that further steps may be introduced by the subdivision either of coils A or C, as well as by the introduction of a resistance in the local closed circuit. In general, however, such arrangements will be neither necessary nor desirable, since by proper designing the sufficient number of steps from rest to full speed may be obtained without the use of any such auxiliary arrangements.

Where four or more motors are used, the motors may be handled in pairs, with the changes of connections shown in the diagrams, or, if desired, further combinations may be adopted. Many such further combinations will be obvious to those skilled in the art and require no description here.

Fig. 3 shows an arrangement of circuits and controller-contacts adapted to secure the combinations shown in Fig. 4. In Fig. 3, M M' represent two motors having the main magnetizing-coils A A and A' A', the rotor-coils B B', and auxiliary coils C C'. $a\ a$ represent the line-wires, which are connected to the controller-fingers $f'$ and $f^6$. Coils A A of motor M are connected to contact-fingers $f^2$ and $f^3$, and the similar coils of motor M' are connected to contact-fingers $f^4$ and $f^5$. One terminal of rotor-winding B is connected, through the reversing-switch, to contact-finger $f^7$. The other terminal is connected to contact-finger $f^{10}$. One terminal of rotor-winding B' is connected to contact-finger $f^{11}$ and the other, through the reversing-switch, to contact-finger $f^{12}$. One terminal of auxiliary coils C C is connected, through the reversing-switch, to contact-finger $f^7$, and the other terminal is connected, through the reversing-switch, to contact-finger $f^8$. One terminal of auxiliary coil C C' is connected, through the reversing-switch, to contact-finger $f^9$ and the other terminal, through the reversing-switch, to contact-finger $f^{12}$. The controller-plates are divided into electrically-connected groups as follows: one group comprising the plates 1, 2, and 6, another 4 and 5, another 3, 7, and 8, another 9, 10, 11, 12, and 13, another 14 and 15, another 16 and 17, another 18 and 19, another 20 and 21, and the last 22, 23, 24, 25, and 26. The first position of the controller is shown by dotted line $1^x$, corresponding to diagram No. 1 in Fig. 4. In this position the current passes from one main to contact-finger 1, to plate 1, to plate 2, to contact-finger 2, through coils A A to contact-finger 3, to plate 4, to plate 5, to contact-finger 4, through coils A' A' to contact-finger 5, to plate 7, to plate 8, to contact-finger 6, and back to the other main. The local circuit is as follows: Rotor-windings B and B' are placed in parallel, the upper brushes of the two motors being connected, through the reversing-switch, to contact-finger 7, to plate 9, to plate 12, and contact-finger 11. The lower brushes are connected through contact-finger 10, plate 24, plate 26, brush 12, and the reversing-switch. The auxiliary coils are placed in series with each other and in parallel with both rotor-circuits. The circuit from the upper brush of the upper motor through both auxiliary fields back to the lower brush of the upper motor is as follows: through the reversing-switch to coils C C, back through the reversing-switch to contact-finger 8, to plate 14, to plate 15, to contact-finger 9 and through the reversing-switch, through coils C' and C', back through the reversing-switch to contact-finger 12, to plate 26, to plate 24, and to the lower brush of the upper motor.

Having thus traced the circuit for one position, it will be necessary to trace the circuits for the remaining positions (indicated by dotted lines $2^x\ 3^x$, &c.) corresponding to the diagrams 2 3, &c., of Fig. 4.

It will be evident that in order to reverse the motors all that is necessary is to reverse the connections of the auxiliary coils C C relative to the rotor-windings B. The reversing-switch in Fig. 3 shows one arrangement adapted for the reversal of the motors. This switch comprises ten contact-fingers $f'^1 f'^2$, &c., and two sets of plates, forward and reverse positions, (indicated by the letters F and R.) It will be seen that by means of contact-fingers $f'^1$, $f'^2$, and $f'^3$ in the ahead position the upper auxiliary coils C and the upper motor-brush $b$ are connected together and to controller-contact $f^7$, while lower coil C' and lower brush $b'$ in the lower motor are connected, through contact-fingers $f'^4 f'^5 f'^6$ of the reversing-switch, to each other and to controller contact-finger $f^{12}$. In the reverse position, on the other hand, upper coil C is connected, through the reversing-switch, to lower brush $b'$ of the second motor and to controller contact-finger 12, while lower coil C' is connected, through the reversing-switch, to upper brush $b$ of the first motor and to controller contact-finger 7. Thus the relative connections of the auxiliary coils and the rotor-windings are reversed. The contact-fingers of the reversing-switch $f'^7$ to $f'^{10}$ are for the purpose of reversing the connections relative to the rotor-windings of the auxiliary coils C C' in changing from series to parallel positions. These contacts could be omitted from the reversing-switch by the addition of two more contact-fingers and sets of plates to the controller instead of connecting one terminal of rotor-winding B and coils C C outside of the controller, as is done in the arrangement shown in Fig. 3, in order to reduce the size of the main controller.

It is evident that other arrangements of controller contacts and plates may be used to attain the same circuit combinations as those which have been described, and my invention is in no way limited to this particular form of controller.

I do not desire to limit myself to the particular construction and arrangement of parts here shown, since changes therein which do not depart from the spirit of my invention and which are within the scope of the appended claims will be obvious to those skilled in the art.

What I claim as new, and desire to secure by Letters Patent of the United States, is—

1. In combination, a plurality of motors having main field-coils and auxiliary field-coils, a source of alternating current, and a switch adapted to connect said main coils to said source and to connect said auxiliary coils in a local circuit with the rotor-windings of said motors and to vary the relative connections of said auxiliary coils and rotor-windings.

2. In combination, a plurality of motors having main field-coils and auxiliary field-coils, and a switch adapted to connect said auxiliary coils in a closed local circuit with the rotor-windings of said motors and to vary the relative connections of said auxiliary coils and said rotor-windings.

3. In combination, a source of alternating current, a plurality of motors having main and induced field-coils, and a switch adapted to connect said main coils in circuit with said source and to connect said auxiliary coils in a local circuit with the rotor-windings of said motors and to vary the relative connections of said windings in both circuits.

4. In combination, a source of alternating current, a plurality of motors having main and auxiliary field-coils, a main circuit including said source and said main coils, a local closed circuit including said auxiliary field-coils and the rotor-windings of said motors, and a switch adapted to vary the relative connections in both circuits.

5. In combination, a plurality of motors having main and auxiliary field-coils, means for supplying alternating current to said main coils, a local closed circuit including said auxiliary coils and the rotor-windings of said motors, and means for varying the connection in said closed circuit.

6. In combination, a plurality of motors having main and auxiliary field-coils, and a switch adapted to connect said auxiliary coils in a closed circuit with the rotor-windings of said motors and to vary the series-parallel relations of said auxiliary coils and said rotor-windings in said closed circuit.

7. In combination, a plurality of motors having main and auxiliary field-coils, a source of alternating current, means for connecting said main coils in series and in parallel to said source, a closed local circuit including said auxiliary coils and the rotor-windings of said motors, and means for varying the series-parallel relations of said windings in said closed circuit.

8. In combination, a plurality of motors having main and auxiliary field-coils, a source of alternating current, and a switch adapted to connect said main coils in series and in parallel to said source, and to connect said auxiliary coils in closed circuit with the rotor-windings of said motors and to vary the series-parallel relations of said auxiliary coils and said windings.

9. In combination, a plurality of motors having main and auxiliary field-coils, and a switch adapted to connect said auxiliary coils in series and in parallel relation with each other to the terminals of the rotor-windings also connected in series and in parallel.

10. In combination, two motors having main and auxiliary field-coils, and a switch adapted to connect said auxiliary coils in series with each other to the terminals of the rotor-windings in parallel with each other, then to connect said auxiliary coils in series to said rotor-windings in series, and then to connect said auxiliary coils in parallel to said rotor-windings in series.

11. In combination, two motors having main and auxiliary field-coils, a source of alternating current, a switch adapted to connect said main coils in series to said source and to connect said auxiliary coils in series to the rotor-windings of said motors in parallel, then to change the rotor-windings to series, then to change the auxiliary coils to parallel, then to change the main coils and the rotor-windings to parallel and the auxiliary coils to series, then to change the rotor-windings to series, and then to change the auxiliary windings to parallel.

12. In combination, a plurality of motors having main and auxiliary field-coils, a local closed circuit including said auxiliary coils and the rotor-windings of said motors, and a reversing-switch adapted to reverse the direction of current-flow in said auxiliary coils relative to the rotor-windings.

13. In combination, a plurality of motors having main and auxiliary field-coils, a main circuit including said main coils and a source of alternating current, a local closed circuit including said auxiliary coils and the rotor-windings of said motors, and a reversing-switch in said closed circuit adapted to reverse the direction of current-flow in said auxiliary coils relative to the rotor-windings.

In witness whereof I have hereunto set my hand this 22d day of October, 1903.

MAURICE MILCH.

Witnesses:
    BENJAMIN B. HULL,
    HELEN ORFORD.